(12) United States Patent
Rogson

(10) Patent No.: US 8,467,776 B2
(45) Date of Patent: Jun. 18, 2013

(54) USER-CONTROLLABLE TELEPHONE CALL PROCESSING

(76) Inventor: Ariel S. Rogson, Portland, OR (US)

( * ) Notice: Subject to any disclaimer, the term of this patent is extended or adjusted under 35 U.S.C. 154(b) by 698 days.

(21) Appl. No.: 12/566,033

(22) Filed: Sep. 24, 2009

(65) Prior Publication Data

US 2011/0069825 A1 Mar. 24, 2011

(51) Int. Cl.
*H04M 3/42* (2006.01)
(52) U.S. Cl.
USPC ..... 455/415; 455/414.1; 455/417; 455/412.1; 455/412.2; 455/422.1; 379/215.01; 379/93.03; 379/201.02; 379/93.04; 379/201.06
(58) Field of Classification Search
USPC ............... 455/404.1, 419, 456.1, 422.1, 418, 455/412.1–414.2, 415; 379/142.02, 201.02, 379/201.06, 93.02, 215.01, 93.03, 93.04, 379/201.07, 201.08; 709/203–211, 226–229
See application file for complete search history.

(56) References Cited

U.S. PATENT DOCUMENTS

| | | | |
|---|---|---|---|
| 7,196,260 B2 | 3/2007 | Schultz | |
| 7,606,578 B2 | 10/2009 | Irvin et al. | |
| 7,675,411 B1 * | 3/2010 | Michaelis et al. | 340/539.12 |
| 7,814,163 B2 | 10/2010 | Lee et al. | |
| 2003/0028621 A1 | 2/2003 | Furlong et al. | |
| 2005/0135240 A1 | 6/2005 | Ozugur | |
| 2007/0223463 A1 | 9/2007 | Weinberger et al. | |
| 2009/0183194 A1 * | 7/2009 | Raftelis | 725/25 |
| 2009/0276623 A1 | 11/2009 | Jevans et al. | |
| 2010/0041386 A1 | 2/2010 | Anderson et al. | |
| 2011/0081881 A1 | 4/2011 | Baker et al. | |

OTHER PUBLICATIONS

Vonage Marketing, LLC (2009), "Ring Lists", retrieved from http://www.vonage.com/features.php?feature=ring_lists&lid=feature_nav_ring_lists&refer_id=WEBFT0706010001W1.
Vonage Marketing, LLC (2009), "Call Hunt", retrieved from http://www.vonage.com/features.php?feature=call_hunt&lid=feature_nav_call_hunt&refer_id=WEBFT0706010001W1.
Vonage Marketing, LLC (2009), "Anonymous Call Block", retrieved from http://www.vonage.com/features.php?feature=acb&lid=feature_nav_acb&refer_id=WEBFT0706010001W1.
Vonage Marketing, LLC (2009), "Do Not Disturb", retrieved from http://www.vonage.com/features.php?feature=dnd&lid=feature_nav_dnd&refer_id=WEBFT0706010001W1.
Vonage Marketing, LLC (2009), "SimulRing", retrieved from http://www.vonage.com/features.php?feature=simulring&lid=feature_nav_simulring&refer_id=WEBFT0706010001W1.
Vonage Marketing, LLC (2009), "Enhanced Call Forwarding", retrieved from http://www.vonage.com/features.php?feature=call_forwarding&lid=feature_nav_call_forwarding&refer_id=WEBFT0706010001W1.
Vonage Marketing, LLC (2009), "Voicemail Plus", retrieved from http://www.vonage.com/features.php?feature=voicemail&lid=feature_nav_voicemail&refer_id=WEBFT0706010001W1.
Vonage Marketing, LLC (2009), "Called ID with Name", retrieved from http://www.vonage.com/features.php?feature=caller_id&lid=feature_nav_caller_id&refer_id=WEBFT0706010001W1.

(Continued)

*Primary Examiner* — Vladimir Magloire
*Assistant Examiner* — Babar Sarwar
(74) *Attorney, Agent, or Firm* — Marger Johnson & McCollom PC

(57) ABSTRACT

Embodiments of the invention include a system to process telephone calls. The system can receive a telephone call and identify the telephone number of the calling party. A database of processing instructions then specifies whether to block the telephone call, forward the telephone call to another telephone number, send the telephone call to a voicemail system or an answering machine, or ring the telephone assigned to the called number. Based on the time of the call, the instructions to be applied can differ.

25 Claims, 10 Drawing Sheets

| Telephone # | Time Interval | Instruction | |
|---|---|---|---|
| 503-555-1234 | MTWThF 0800-1659 | ● Ring ○ Block ○ Forward: ○ Voicemail: | 315 |
| | | Override: ○ Yes ● No | 345 |
| 503-555-1234 | MTWThF 0000-0759 | ○ Ring ○ Block ○ Forward: ● Voicemail: 1 | 327 |
| | | Override: ○ Yes ● No | 348 |
| 503-555-1234 | MTWThF 1700-2359 | ○ Ring ○ Block ○ Forward: ● Voicemail: 1 | 330 |
| | | Override: ○ Yes ● No | 351 |
| 503-555-1234 | SaSu 0000-2359 | ○ Ring ○ Block ○ Forward: ● Voicemail: 1 | 333 |
| | | Override: ○ Yes ● No | 354 |
| 503-555-2345 | MTWThFSaSu 0000-2359 | ○ Ring ● Block ○ Forward: ○ Voicemail: | 336 |
| | | Override: ○ Yes ● No | 357 |
| 503-555-3456 | MTWThF 0800-1659 | ○ Ring ○ Block ○ Forward: ● Voicemail: 2 | 363 |
| | | Override: ● Yes ○ No | 360 |
| ⋮ | ⋮ | ⋮ | |

OTHER PUBLICATIONS

Vonage Marketing, LLC (2009), "Vonage Visual Voicemail", retrieved from http://www.vonage.com/features.php?feature=visual_voicemail&lid=feature_nav_visual_voicemail&refer_id=WEBFT0706010001W1.

D-Link Corporation/D-Link Systems, Inc., "IDR-655 Xtreme N Gigabit Router", May 23, 2008 (four pages).

AT&T, "AT&T Smart Limits for Wireless: the freedom of a cell phone with sensible boundaries", retrieved at http://www.wireless.att.com/learn/articles-resources/parental-controls/smart-limits.jsp (2010).

AT&T, "AT&T Smart Limits for Wireless: the freedom of a cell phone with sensible boundaries", retrieved at http://web.archive.org/web/20070914043505/http://www.wireless.att.com/learn/articles-resources/parental-controls/smart-limits.jsp (2007).

AT&T, "Frequently Asked Questions—AT&T Smart Limits for Wireless: Everything you'd like to know about AT&T Smart Limits for Wireless", retrieved at http://www.wireless.att.com/learn/articles-resources/parental-controls/faq.jsp (2010).

\* cited by examiner

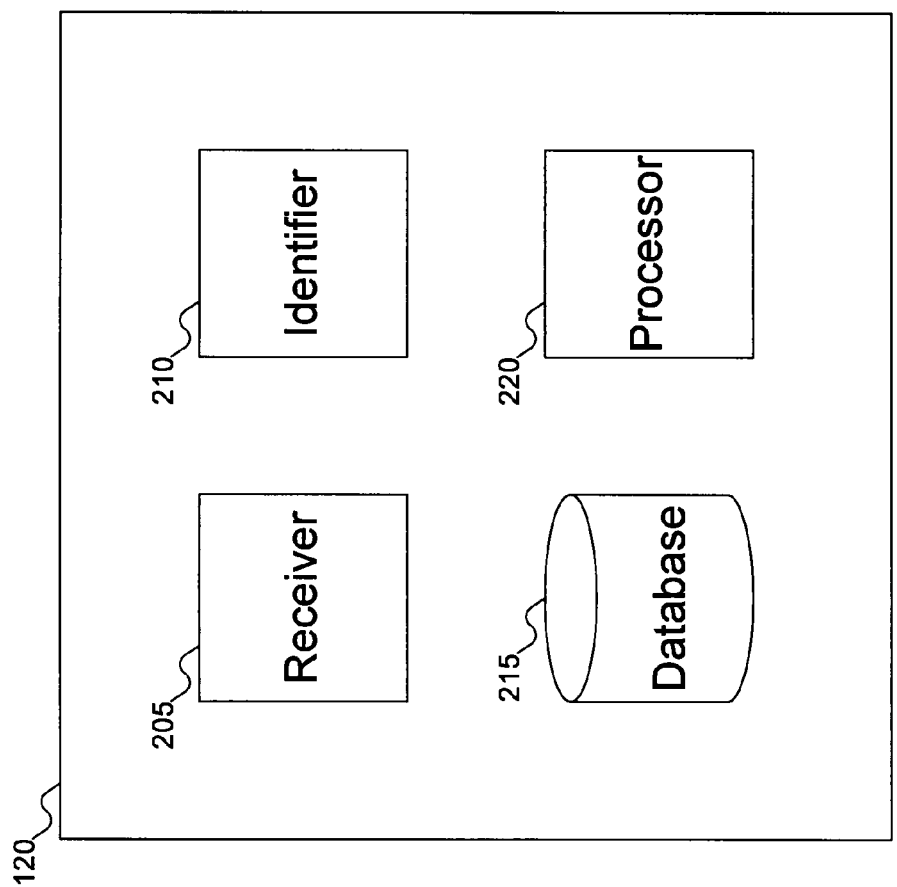

215

| Telephone # | Time Interval | Instruction |
|---|---|---|
| 503-555-1234 <br> 303 | MTWThF <br> 0800-1659 <br> 312 | ◉ Ring <br> ○ Block <br> ○ Forward: <br> ○ Voicemail:    315 <br> Override: ○ Yes ◉ No    345 |
| 503-555-1234 <br> 303 | MTWThF <br> 0000-0759 <br> 318 | ○ Ring <br> ○ Block <br> ○ Forward: <br> ◉ Voicemail: 1    327 <br> Override: ○ Yes ◉ No    348 |
| 503-555-1234 <br> 303 | MTWThF <br> 1700-2359 <br> 321 | ○ Ring <br> ○ Block <br> ○ Forward: <br> ◉ Voicemail: 1    330 <br> Override: ○ Yes ◉ No    351 |
| 503-555-1234 <br> 303 | SaSu <br> 0000-2359 <br> 324 | ○ Ring <br> ○ Block <br> ○ Forward: <br> ◉ Voicemail: 1    333 <br> Override: ○ Yes ◉ No    354 |
| 503-555-2345 <br> 306 | MTWThFSaSu <br> 0000-2359 <br> 339 | ○ Ring <br> ◉ Block <br> ○ Forward: <br> ○ Voicemail:    336 <br> Override: ○ Yes ◉ No    357 |
| 503-555-3456 <br> 309 | MTWThF <br> 0800-1659 <br> 342 | ○ Ring <br> ○ Block <br> ○ Forward: <br> ◉ Voicemail: 2    363 <br> Override: ◉ Yes ○ No    360 |
| ⋮ | ⋮ | ⋮ |

| Telephone # | Time Interval | Instruction |
|---|---|---|
| Default<br>405 | MTWThF<br>0800-1659<br>410 | ○ Ring<br>○ Block<br>○ Forward:<br>● Voicemail: 2  415<br>Override: ○ Yes  ● No  450 |
| Default<br>405 | MTWThF<br>0000-0759<br>420 | ● Ring<br>○ Block<br>○ Forward:<br>○ Voicemail:  435<br>Override: ○ Yes  ● No  455 |
| Default<br>405 | MTWThF<br>1700-2359<br>425 | ● Ring<br>○ Block<br>○ Forward:<br>○ Voicemail:  440<br>Override: ○ Yes  ● No  460 |
| Default<br>405 | SaSu<br>0000-2359<br>430 | ● Ring<br>○ Block<br>○ Forward:<br>○ Voicemail:  445<br>Override: ○ Yes  ● No  465 |
| ⋮ | ⋮ | ⋮ |

FIG. 4

| Telephone # | Caller Name | Caller Group |
|---|---|---|
| 503-555-1234 _303_ | John Doe _605_ | Business _620_ |
| 503-555-2345 _306_ | | Telemarketer _625_ |
| 503-555-3456 _309_ | Mary Smith _615_ | Personal _630_ |
| 503-555-4567 _610_ | Mary Smith _615_ | Personal _630_ |
| ⋮ | ⋮ | ⋮ |

| Caller | Time Interval | Instruction | |
|---|---|---|---|
| Business _620_ | MTWThF 0800-1659 _312_ | ◉ Ring <br> ○ Block <br> ○ Forward: <br> ○ Voicemail: _315_ | |
| | | Override: ○ Yes <br> ◉ No _345_ | |
| Business _620_ | MTWThF 0000-0759 _318_ | ○ Ring <br> ○ Block <br> ○ Forward: <br> ◉ Voicemail: 1 _327_ | |
| | | Override: ○ Yes <br> ◉ No _348_ | |
| Business _620_ | MTWThF 1700-2359 _321_ | ○ Ring <br> ○ Block <br> ○ Forward: <br> ◉ Voicemail: 1 _330_ | |
| | | Override: ○ Yes <br> ◉ No _351_ | |
| Business _620_ | SaSu 0000-2359 _324_ | ○ Ring <br> ○ Block <br> ○ Forward: <br> ◉ Voicemail: 1 _333_ | |
| | | Override: ○ Yes <br> ◉ No _354_ | |
| Telemarketer _615_ | MTWThFSaSu 0000-2359 _339_ | ○ Ring <br> ◉ Block <br> ○ Forward: <br> ○ Voicemail: _336_ | |
| | | Override: ○ Yes <br> ◉ No _357_ | |
| Mary Smith _615_ | MTWThF 0800-1659 _342_ | ○ Ring <br> ○ Block <br> ○ Forward: <br> ◉ Voicemail: 2 _363_ | |
| | | Override: ◉ Yes <br> ○ No _360_ | |
| ⋮ | ⋮ | ⋮ | |

FIG. 7

USER-CONTROLLABLE TELEPHONE CALL PROCESSING

FIELD

This invention pertains to processing telephone calls, and more particularly to processing telephone calls in a manner that considers the identity of the calling party and the time of the telephone call.

BACKGROUND

When Alexander Graham Bell invented the telephone, he came up with an entirely new form of communication. No longer was communication dependent on the speed of a person delivering mail: people could talk with each other almost instantly. By simply identifying the person with whom you wished to talk (first by name to an operator, later by telephone number), two people could talk with each other.

Improvements followed over the years. Conference calling permits three or more people, all at different telephones, to talk with each other. Facsimile transmission supports sending pictures via the telephone. Telephone companies added numerous features: customers can now block specific telephone numbers (although the number of telephone numbers that can be blocked is kept small), and can forward all telephone calls to another number. And with the advent of the cellular telephone, it has become possible for a person to carry his telephone with him wherever he goes.

But as a consequence of these improvements, many people have multiple different telephone numbers at which they can be reached. For example, it is common for a person to have a home telephone number, a work telephone number (perhaps two, if their telephone system includes a telephone number to the receptionist at work and a direct telephone line to the person's desk), a cellular telephone number, and a facsimile telephone number (perhaps two, if the person has a facsimile machine at home as well as at work). The person might even have more telephone numbers that can reach him. This proliferation of telephone numbers makes it harder for one person to reach another: the caller might have to try several different telephone numbers before reaching the person with whom he wants to talk.

To deal with this proliferation of telephone numbers, some strategies have been developed. Some people give out only their work telephone numbers to business associates, or their home and cellular telephone numbers only to friends and family. This reduces the number of telephone numbers a calling party would have to try before locating (or failing to locate) the party with whom they want to talk.

People have also developed some general rules to aid in telephone call management. Generally, a person can be expected to be at their work telephone number during business hours. And answering machines and voicemail systems make it possible for a person to leave a message when he cannot reach the person with whom he wants to talk. But even these general rules do not apply all of the time. For example, when a person is on vacation (or taking personal time off), he cannot be reached at his work telephone number during business hours.

A need remains for a way to address these and other problems associated with the prior art.

BRIEF DESCRIPTION OF THE DRAWINGS

FIG. 2 shows details of the telephone call processor of FIG. 1.

FIGS. 3-4 show details of the database of processing rules of FIG. 2.

FIG. 6 shows details of the mapping database of FIG. 5.

FIG. 7 shows details of the database of processing rules of FIG. 5.

DETAILED DESCRIPTION

Figure 1:
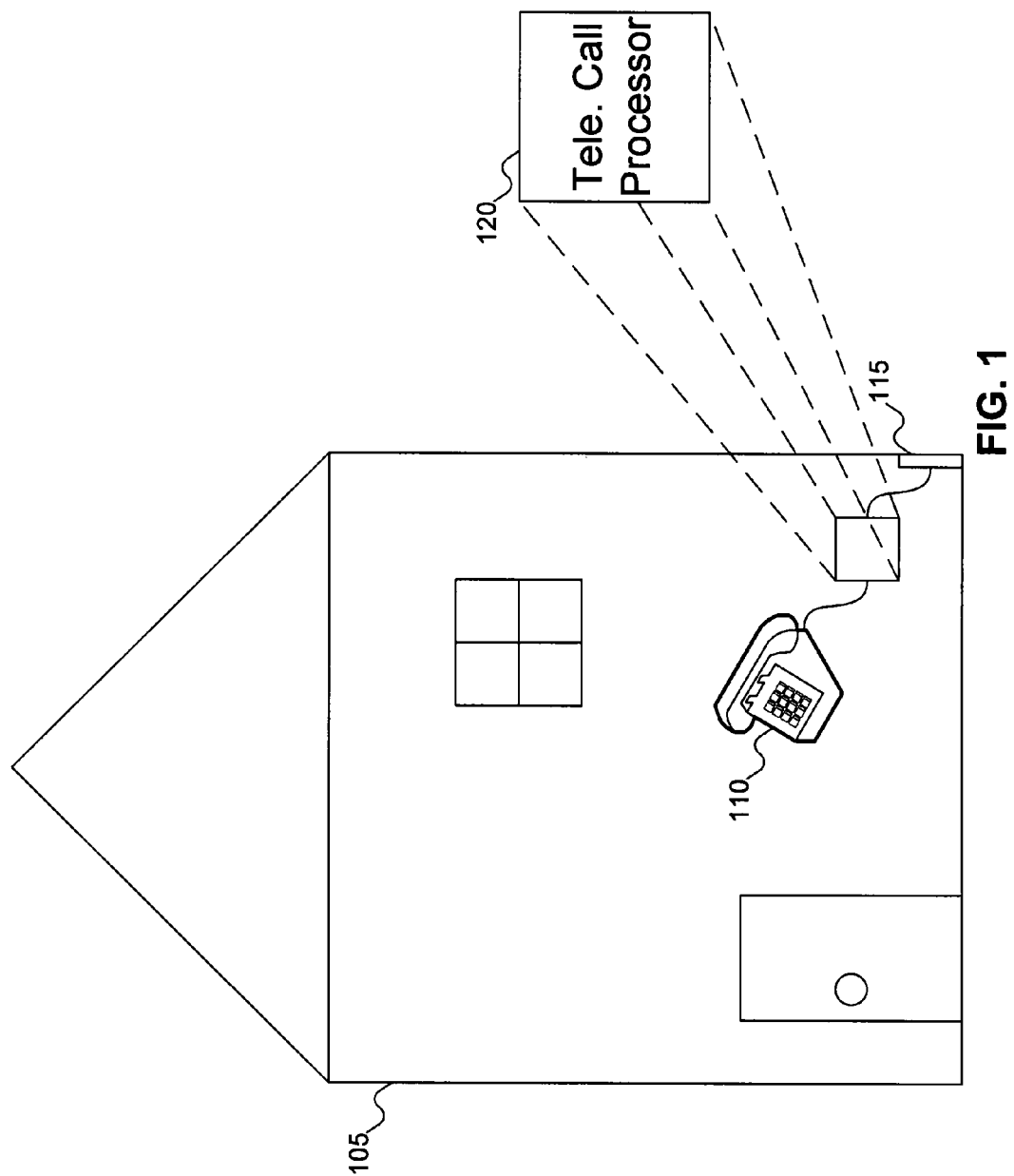
FIG. 1 shows a home including a telephone call processor to process telephone calls according to a first embodiment of the invention.

FIG. 1 shows a home including a telephone call processor to process telephone calls according to a first embodiment of the invention. In FIG. 1, home 105 is shown. Home 105 can be a person's home, but a person of ordinary skill in the art will recognize that home 105 could also be a business location. Indeed, home 105 can be any site equipped to receive telephone calls. Thus, home 105 could also be place where a person can use a cellular telephone (as discussed below). In this situation, there is no physical home 105, but rather an abstract concept of "home" being wherever the user is physically located.

Home 105 includes telephone 110. Telephone 110 can be any standard telephone as can be purchased or otherwise used today. Telephone 110 can also include an answering machine, either built in to telephone 110 or as a separate element.

Normally, telephone 110 is connected to jack 115, which leads back to the telephone company (not shown in FIG. 1). Instead, however, in one embodiment of the invention, telephone call processor 120 is situated between telephone 110 and jack 115. Telephone call processor 120 processes telephone calls, identifying who placed the telephone call, determining the time the telephone call was placed, and processing the telephone call according to records in the database. To that end, telephone call processor 120 can include a clock (not shown in FIG. 1) to determine the time the telephone call was placed. Alternatively, telephone call processor 120 can include a receiver (not shown in FIG. 1) to receive time information from an external source. For example, clock information can be received via a wired or wireless source.

A person of ordinary skill in the art will recognize that telephone calls can be placed between persons in different time zones. For example, a person in New York, N.Y. can call a person in Portland, Oreg. Because New York, N.Y. is in the Eastern time zone and Portland, Oreg. is in the Pacific time zone, there is a three hour time difference between the two parties to the telephone call. This begs the question as to what time should be used to determine "the time the telephone call was placed". Because the person placing the telephone call clearly wants to talk with the other person, the party who is not necessarily prepared for the telephone call is the recipient. Therefore, in one embodiment of the invention, the "time the telephone call was placed" refers to the time the telephone call was placed, at the recipient's location. But a person of ordinary skill in the art will recognize that alternative embodiments of the invention can refer to the time the telephone call was placed, at any desired location.

In terms of how telephone calls are processed, there are four basic alternatives. A telephone call can be blocked outright, which prevents the calling party from speaking with the user (or leaving a message for the user). A telephone call can be allowed to ring through to the called telephone number, which completes the call as though telephone call processor 120 were not part of the circuit. A telephone call can be forwarded to another telephone number: normally, this option would be used when the user expects to be able to receive calls at the other telephone number but not at the called telephone number: this is similar to traditional call forwarding (except that the forwarding is specific to the calling party and the time of the call, rather than general to all telephone calls at the called telephone number while call forwarding is in effect). Finally, a telephone call can be directed to a voicemail box, where the calling party can leave a message for the user.

When telephone call processor 120 is installed at the user's home, as shown in FIG. 1, forwarding a call to another telephone number might not be as simple as an instruction at the telephone company to forward all calls to another telephone number. For example, the telephone company can perform a call forward operation at their switch, before the call would otherwise be completed. But by the time the telephone call has been received at telephone call processor 120 in FIG. 1, the telephone call has essentially been completed: the only question is whether the call will be answered or not. In this situation, forwarding a telephone call might not be handled at the telephone company's switch. Instead, call forwarding can be mimicked using a second telephone line at home 105. Telephone call processor 120 uses the second telephone line to place an outgoing call to the forwarding telephone number, then conferences the two telephone calls together, effectively simulating a forwarded telephone call. Depending on the options offered by the telephone company, it might even be possible for telephone call processor 120 to substitute the caller ID of the original caller for the user's regular caller ID, so that the user knows whose call is being forwarded.

Although FIG. 1 shows telephone 110 and telephone call processor 120 as separate objects, a person of ordinary skill in the art will recognize that these two objects can be combined into a single physical unit. That is, telephone 110 can include the necessary equipment and/or programming to include the functionality of telephone call processor 120.

As mentioned above, embodiments of the invention can include cellular telephones. Modern cellular telephones, such as the Apple® iPhone® mobile digital device and the Palm® Pre™ smartphone among others, are, in fact, much more than just cellular telephones. (Apple and iPhone are registered trademarks of Apple Inc.; Palm and Pre are trademarks of Palm, Inc.) These devices can be viewed as small form-factor computers, having built-in operating systems, and allowing end-users to add new capabilities in the form of installable applications. As such, telephone call processor 120 can be implemented as software that can be installed on the hardware built into such devices. Such application installation would give these devices the functionality of embodiments of the claimed invention.

FIG. 2 shows details of the telephone call processor of FIG. 1. In FIG. 2, telephone call processor 120 includes receiver 205, identifier 210, database 215, and processor 220. Receiver 210 receives the telephone call. Identifier 210 identifies the calling party. For example, identifier 210 can access the identity of the calling party from caller identification information sent with the telephone call.

Once the calling party is identified, telephone call processor 120 can access database 215 to determine what rules apply to this telephone call. Once the rules have been identified, processor 220 can then process the telephone call according to the identified rules.

From the above description, it should be apparent that the rules in database 215 control how embodiments of the invention work. FIGS. 3-4 show details of the database of processing rules of FIG. 2. In FIG. 3, database 215 includes various rules that can be applied to various telephone numbers. For example, in FIG. 3, database 215 includes four different rules applicable to telephone number 303 (503-555-1234), one rule applicable to telephone number 306 (503-555-2345), and one rule applicable to telephone number 309 (503-555-3456). These various rules apply only to the indicated telephone numbers; thus, for example, the rules applicable to telephone number 303 (503-555-1234) do not apply to telephone number 309 (503-555-3456).

To give some more description, telephone number 303 (503-555-1234) includes four rules. The first rule specifies that telephone calls received at time interval 312 between 8:00 am and 4:59 pm Monday through Friday are to be allowed to ring through (instruction 315). But calls from telephone number 303 (503-555-1234) at any other time (that is, in time interval 318 (between 12:00 am and 7:59 am Monday through Friday), time interval 321 (between 5:00 pm and 11:59 pm Monday through Friday), or time interval 324 (any time on Saturday or Sunday) are directed to the first voicemail account (instructions 327, 330, and 333). These rules might be applicable to, say, a known business colleague with whom the user only wants to talk during business hours: at other hours, the telephone calls should be automatically directed to voicemail.

For telephone number 306 (503-555-2345), the user has only one rule: telephone calls from this telephone number should be blocked (instruction 336), regardless of the day or time (time interval 339).

For telephone number 309 (503-555-3456), the user has also one rule: between 8:00 am and 4:59 pm Monday through Friday (time interval 342), the user wants telephone calls routed to a voicemail account. But in contrast to the rules applicable to telephone number 303 (503-555-1234), telephone calls from telephone number 309 (503-555-3456) are to be routed to a different voicemail box. This can occur, for example, if telephone number 309 (503-555-3456) is a telephone number of a known friend, who would understand that during business hours, the user does not want to spend time on personal matters.

In the above discussion, the term "rule" is intended to refer to the combination of the telephone number, the time interval, and the how calls from that telephone number during that time interval are to be processed. In contrast, the term "instruction" is intended to refer to the specific processing to apply to a particular telephone number during a particular time interval. Thus, for example, one rule in database 215 includes telephone number 303, time interval 312, and instruction 315 (and option 345, as discussed below). Nevertheless, the terms "rule" and "instruction" are somewhat interchangeable, and a person of ordinary skill in the art will understand from context the meaning of the terms, even if the usage varies.

Although FIG. 3 shows time intervals 312, 318, 321, 324, 339, and 342 in a textual manner, a person of ordinary skill in the art will recognize that database 215 can store these time intervals in any desired manner, and that the user can specify the time intervals in any desired manner. For example, the time intervals might be specified using checkboxes that cover the days on which the time intervals apply, and then offer the user to set the time range for those days using scroll wheels, or text boxes, or drop-down lists, or any other desired mechanism.

As described above, a user can have telephone calls automatically routed to voicemail. For example, instruction 363 specifies that calls from telephone number 309 (503-555-3456) are to be routed to a voicemail box during business hours, to avoid personal interruptions. A person of ordinary skill in the art will recognize that there can be emergencies that would justify interrupting the user even during business hours. But, as described above, if all telephone calls from a particular calling party, regardless of the telephone number of the user called, would cause the telephone call to be processed in the same way, there would be no way for the calling party to inform the user about the emergency. For example, if the user has configured the system so that the same rules apply whether the user is called at his home telephone number, work telephone number, or cellular telephone number, there is no way for the calling party to avoid the user's rules.

To address this situation, embodiments of the invention can include the ability for a caller to override the rules in database 215, so as to handle emergencies. For example, the calling party could hear a message to the effect of "The party you have called has automatically directed your telephone call to voicemail at this time. If this is an emergency, please press 1 and your call will be connected immediately." This gives the calling party the ability to circumvent the processing rules when necessary.

But a person of ordinary skill in the art will recognize that this override capability is not necessarily desirable for all telephone callers. For example, the user might not want business callers to be able to reach him at any hour of the day. Similarly, if there is a telephone number that the user wants to block, the user would hardly want the caller to be able to override the call block. (And even if the user might be willing to receive calls from a particular person at certain times, that does not mean the user would want that person to be able to reach the user at all times.) Thus, embodiments of the claimed invention let the user specify, as an option, whether or not the calling party can override the user's instructions. If the user specifies that the calling party cannot override the instructions, then the instructions are followed without giving the calling party the opportunity to override the instructions. Overrides 345, 348, 351, 354, 357, and 360 allow the user to specify whether the corresponding processing instructions can be overridden.

FIG. 3 shows how the user can specify instructions for specific telephone numbers. But if the user were to have to specify how all telephone calls are processed based on the calling party's telephone number, the user would have to include a lot of rules. Furthermore, this structure would not allow the user to control calls for which the user has not specified a rule. For this reason, embodiments of the claimed invention permit the user to specify default rules: rules that are applied in case there are no specific rules associated with the calling party's telephone number. (The default rules can also be applied in case the calling party blocks his caller ID.)

FIG. 4 shows various default rules defined by the user. For default telephone number 405, the user has specified that, between 8:00 am and 4:59 pm Monday through Friday (time interval 410), calls are to be directed to the user's second voicemail account (instruction 415). Between 12:00 am and 7:59 am Monday through Friday (time interval 420), 5:00 pm and 11:59 pm Monday through Friday (time interval 425), and all day Saturday and Sunday (time interval 430), calls are to be allowed to ring through (instructions 435, 440, and 445). Further, these rules cannot be overridden by the calling party (overrides 450, 455, 460, and 465).

The reader might notice that, for any particular telephone number, the time intervals specified in database 215 in FIGS. 3-4 do not overlap. By avoiding any overlap of time intervals, the telephone call processor can avoid the problem of what rule to apply when rules conflict. For example, if the user specifies one rule to route a call to a voicemail box during one time interval and a second rule to ring the call through during another time interval, the telephone call processor would not know which rule to apply if these time intervals overlap and a call comes in during this overlap period. Thus, in one embodiment of the invention, it is important that time intervals do not overlap, at least for any given calling party. Embodiments of the invention can include an instruction validator (not shown) to verify that, for any individual telephone number, the time intervals do not overlap. But a person of ordinary skill in the art will recognize that overlapping time intervals can be permitted: the telephone call processor can either apply any applicable rule arbitrarily, or can apply them in some sequence. (The converse situation, where there is a gap in time intervals, is not a problem, as default rules can be applied in that situation. And if there is a gap in the default rules as well, the telephone call can be allowed to ring through during the gap, as if the telephone call processor were not part of the circuit.)

In FIGS. 3-4, it is assumed that the telephone number of the calling party can be identified. If a caller has set up his telephone system to block his caller ID, then his telephone calls will not include his caller ID. When such a call is received by the user, the user will not know who the calling party is, and so the system would not be able to process the telephone call. In one embodiment of the invention, telephone calls from blocked caller IDs are processed using the default rules (as shown in FIG. 4).

In another embodiment, the user can instruct his telephone company to prevent telephone calls from blocked caller IDs to be completed. When a telephone call is received from a calling party who has blocked his caller ID, the telephone company informs the calling party that the call cannot be completed unless the caller ID information is released. The calling party can then choose whether to release his caller ID information and complete the call (which would enable embodiments of the invention to process the telephone call), or refuse to release his caller ID information, in which case the call is terminated.

In combination, using default rules and the telephone company block of anonymous telephone calls gives users significant control over telephone call processing. But in a third embodiment, the system can include rules that apply specifically to anonymous telephone calls. Such rules would be similar to the default rules, except that these rules would apply specifically to telephone calls with blocked caller IDs.

FIGS. 3-4 also focus on using the telephone number of the calling party to locate the rules to apply. Embodiments of the invention can also use non-telephone number identifiers for the calling party in database 215. For example, caller ID systems often provide a name for the calling party. Database 215 can include rules that process telephone calls based on the name of the calling party, rather than the telephone number of the calling party.

In yet another embodiment of the invention, the telephone call processor can include a database that internally maps telephone numbers to names for calling parties, rather than relying on the name provided as part of the caller ID service. In this manner, the user can provide specific names for particular calling parties independent of the name provided by the caller ID service. (Providing a mapping from a telephone number to a calling party name internally to the telephone call processor also avoids the complication that the name provided by the caller ID service can change outside of the control of the user, which would mean that the user's special rules for that calling party might no longer be applied after the name change.)

Figure 5:
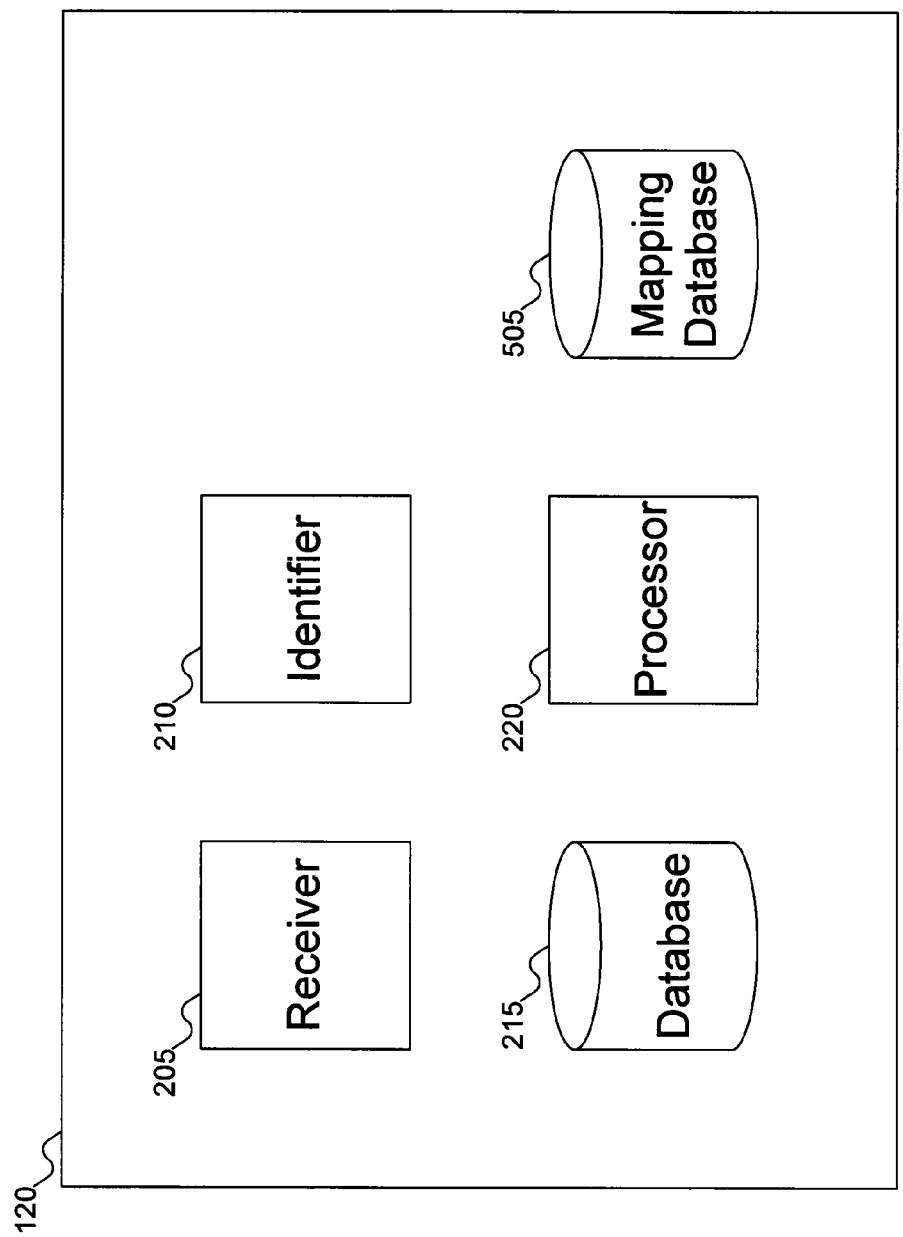
FIG. 5 shows details of the telephone call processor of FIG. 1, according to a second embodiment of the invention.

FIGS. 5-7 show an example of how embodiments of the invention can use non-telephone number identifiers to control the processing of the telephone call. In FIG. 5, telephone call processor 120 also includes mapping database 505. As discussed below with reference to FIG. 6, mapping database 505 provides a way to map a telephone number of the calling party to an identifier other than the telephone number of the calling party. In this embodiment of the invention, identifier 210 can use both the telephone number of the calling party and mapping database 505 to identify the caller. But a person of ordinary skill in the art will recognize that if the caller ID is used as a non-telephone number identifier, then mapping database 505 can be omitted. In addition, although FIG. 5 shows database 215 and mapping database 505 as separate databases, a person of ordinary skill in the art will recognize that these databases can be combined.

FIG. 6 shows details of mapping database 505. In FIG. 6, the telephone numbers shown in the database of FIG. 3 are shown again, but this time mapped to non-telephone number identifiers. For example, database 505 shows telephone number 303 (503-555-1234) as mapped to caller name 605 ("John Doe"), and telephone numbers 309 (503-555-3456) and 610 (503-555-4567) as mapped to caller name 615 ("Mary Smith").

In addition to assigning a caller name to a telephone number, telephone numbers can also be assigned to groups. For example, database 505 shows telephone number 303 (503-555-1234) as mapped to caller group 620 ("Business"), telephone number 306 (503-555-2345) as mapped to caller group 625 ("Telemarketer"), and telephone numbers 309 (503-555-3456) and 610 (503-555-4567) as mapped to caller group 630 ("Personal").

It will be noted that there is no caller name associated with telephone number 306 (503-555-2345). The system is capable of operating without having either an associated caller name or caller group. For example, most users treat all telemarketers the same, regardless of who they are, nor do most users care about who the telemarketer is. Thus, no specific caller name is needed for a telemarketer. Similarly, the system can operate with a caller name but not caller group. (In fact, the system can operate with no identifier associated with a telephone number in mapping database 505. In this situation, the entry in mapping database 505 would be unnecessary, and the system default rules, if any exist, would apply to the telephone number.)

Now, database 215 can be as represented as shown in FIG. 7. Database 215 as shown in FIG. 7 is very similar to FIG. 3. But instead of using the telephone number, database 215 locates instructions based on a non-telephone number identifier. For example, caller group 620 ("Business") includes the rules formerly associated with telephone number 303 (503-555-1234) in FIG. 3. Similarly, caller group 625 ("Telemarketer") includes the rules formerly associated with telephone number 306 (503-555-2345) in FIG. 3. And caller name 615 ("Mary Smith") includes the rules formerly associated with telephone number 309 (503-555-3456) in FIG. 3.

There are some advantages to this embodiment of the invention. First, instead of each telephone number having specific instructions associated with it, telephone numbers can be grouped together in meaningful ways, and the instructions associated with the grouping. This simplifies rule management. For example, consider the rules associated with caller name 615 ("Mary Smith"). As shown in FIG. 6, there are two telephone numbers associated with this caller. When telephone numbers are mapped directly to instructions, there would need to be instructions for each telephone number. But when telephone numbers are mapped to identifiers, which are in turn used to locate the instructions, there need be only one set of rules for the grouping. This simplifies database 215 as shown in FIG. 7, which reduces the possibility of error in programming the rules.

In a similar manner, database 215 includes rules for caller group 620 ("Business"). These rules can be thought of as default rules to apply to all telephone calls from telephone numbers associated with caller group 620 ("Business"). Thus, instead of needing individual rules for each business telephone number, a single set of rules can be used.

Second, it will be noted that database 215 in FIG. 7 uses both caller group identifiers, such as caller groups 620 ("Business") and 625 ("Telemarketer"), and caller name identifiers, such as caller name 615 ("Mary Smith"). This means that rules can be defined for both groups of individuals and specific individuals. (A person of ordinary skill in the art will recognize that including two identifiers is somewhat arbitrary, as any result achieved using two identifiers can also be achieved using only one identifier, at the potential cost of needing more rules in database 215.) By defining rules for groups rather than for individual callers, rule management is simplified and the possibility of error is reduced.

For example, a user might have a number of callers that are considered business contacts, and a number of personal contacts. When the user goes on vacation, he might want to automatically direct all business calls to a business voicemail box, and automatically direct all personal calls to a personal voicemail box or forward all personal calls to a cellular telephone, depending on whether the user expects the cellular telephone to work. With rules associated with individual telephone numbers, changing the rules for vacation could be an onerous task. But if the user has defined rules associated with a group, the user need only change the group rules to change processing of telephone calls from all contacts in that group (subject to the caveat described below). Similarly, restoring the "normal" operation upon return from vacation is equally easy.

One issue that can arise in this embodiment of the invention is when there are rules associated with both the caller's name and group. For example, a user can define a caller group "Personal", which includes all personal contacts. This group can have default instructions to route telephone calls to voicemail during business hours. But the user can also define instructions for his spouse, allowing calls from his spouse to connect immediately. Because the rules associated with the spouse's identifier are more specific than the rules for the group, rules associated with an individual caller name can override rules associated with the group. But when such group rules are overridden by individual rules, one can see that the individual rules will continue to apply, even if the user changes the group rules.

Another advantage of this embodiment of the invention is that it simplifies adding new callers to the system. For example, assume that the user receives a telephone call from a person at 503-555-5678, a new calling telephone number to the user. After taking the call, it turns out that this telephone number belongs to a business contact (telephone number 503-555-5678 could be either a new business contact, or a new telephone number for an old business contact). The user can just add a new entry to mapping database 505, mapping telephone number 503-555-5678 to caller group "Business". Now the rules associated with the caller group "Business" will apply to calls from this number. (The user can also map telephone number 503-555-5678 to a caller name, if desired.)

In FIGS. 3-4 and 7, it will be noted that the user has specified that calls should be routed to different voicemail boxes. For example, instructions 327, 330, and 333 specify that the telephone calls should be routed to voicemail box 1, but instructions 363 and 415 specify that the telephone calls should be routed to voicemail box 2. In this manner, the user can manage multiple voicemail boxes for different purposes (e.g., voicemail box 1 might be the user's work voicemail, and voicemail box 2 might be the user's home voicemail), and automatically route different telephone calls to the different voicemail boxes.

As discussed above, most users have multiple telephone numbers at which they can receive calls. It is possible for the user to establish rules for processing telephone calls at each of these telephone numbers independently: this allows the user to specify different rules for how to process telephone calls at each telephone number. But if the user wants to apply the same rules for processing telephone calls at each of his possible telephone numbers, this creates a lot of repetition for the user, as he must construct the rules for each telephone number independently. In one embodiment of the invention, the user can specify a single set of rules for processing telephone calls, and have those rules apply to all telephone calls the user receives, regardless of the telephone number called by the calling party. This might involve copying (and synchronizing) rules between multiple telephone call processors, if different telephone call processors govern the operation of the different telephone numbers.

One small change would be made in this embodiment of the invention. When the rules are to be applied independent of the called telephone number, there can be confusion regarding what should happen when the instruction is to ring the call through or forward the telephone call to another telephone number. For example, if the call is allowed to ring through, the user is not going to know which telephone will ring. And forwarding the telephone call to the called number is essentially allowing the call to ring through. Thus, in this embodiment of the invention, there can be one instruction covering both possibilities (ring through and forward), specifying where the call should be routed (based on the time the call was placed). This result can be achieved by, for example, disabling the ring through option, and letting the forward option indicate where the call should ring, which might be the same telephone number as that called in the first place (in which case the system would operate as if it let the call ring through). A person of ordinary skill in the art will also recognize that it is possible to include both the ring through and forward options, applying their standard meaning.

Figure 8:
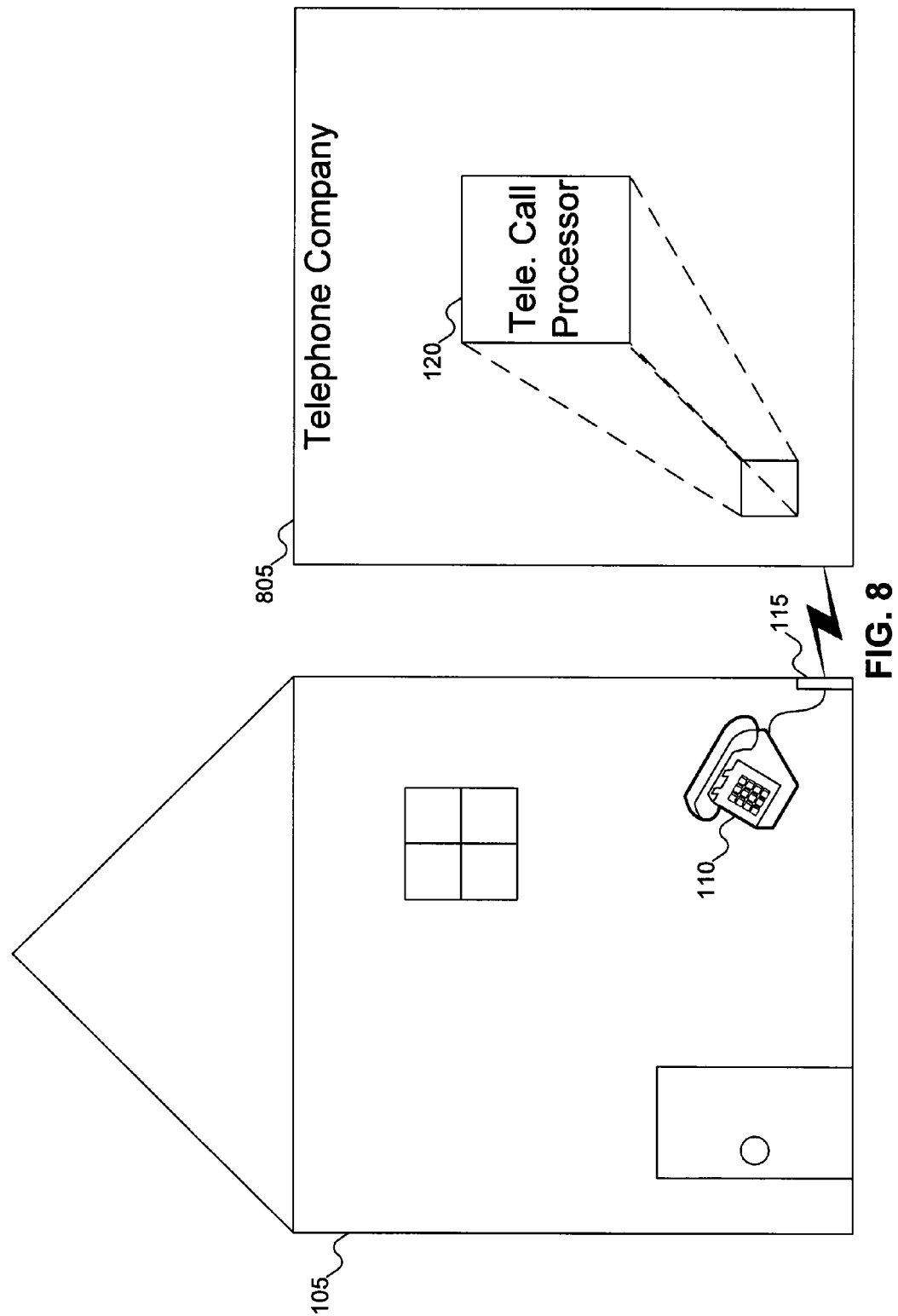
FIG. 8 shows a telephone company including a telephone call processor to process telephone calls according to a third embodiment of the invention.

FIG. 8 shows a telephone company including a telephone call processor to process telephone calls according to a second embodiment of the invention. But in contrast to FIG. 1, where telephone call processor 120 is installed at the user's home, telephone call processor 120 is installed at telephone company 805, and implemented using the existing computer systems of telephone company 805. This embodiment has the advantage that call forwarding can be achieved using the services of the telephone company, rather than mimicking call forwarding in some manner.

Embodiments of the invention assume that there is some way for the user to modify the information in the telephone call processor. For example, the user might decide that the old telephone call processing rules do not serve him any more. Or, the user might have a new telephone number to which calls should be forwarded. Or, the user might have learned the telephone number of a new calling party for which the user wants to add a new rule. Or, the user might want to modify the mapping from telephone numbers to names for the calling party.

To modify the rules, telephone call processor 120 can be connected to a computer in some manner, so that the user can see and modify the rules. For example, telephone call processor 120 can be connected (either by wireline or wirelessly) to a user's computer. Or, telephone call processor 120 can be accessed via the world wide web using an interface (for example, if telephone call processor 120 is installed at the telephone company, or if installed at the user's home but connected to the world wide web). Or, telephone call processor 120 can support a detachable storage device where the processing rules can be stored; this detachable storage device can then be connected to a user's computer to modify the processing rules, after which the detachable storage device can be again connected to telephone call processor 120. Or, telephone call processor 120 can support a detachable storage device which can be connected to a computer to store updates to the processing rules; when the detachable storage device is then connected to telephone call processor 120, the processing rules stored in telephone call processor 120 can be updated accordingly. Examples of detachable storage devices can include flash drives (such as USB keys), memory sticks, memory cards, and other such devices. A person of ordinary skill in the art will recognize other examples of detachable storage devices that can be used to store the processing rules of telephone call processor 120. A person of ordinary skill in the art will also recognize other ways in which the rules used by telephone call processor 120 to process telephone calls can be modified.

A person of ordinary skill in the art will recognize that embodiments of the invention work perfectly well even when the user has call waiting. Call waiting is a service whereby, if the user is talking on the telephone when a call comes in, the user is notified about the new telephone call (without call waiting, the calling party either hears a busy signal or is routed directly to a voicemail box). The user can choose to ignore the new telephone call, end the existing telephone call and switch to the new telephone call, put the existing telephone call on hold and temporarily switch to the new call, or conference the two calls together. In an embodiment of the invention, when the user has call waiting service, the system operates to process the call before attempting to connect the call (which could trigger call waiting). For example, if the user has established a rule that routes telephone calls from a caller directly to a voicemail box, the new telephone call can be routed directly to the user, without attempting to ring through (and thereby invoke call waiting). The only situations in which call waiting would occur using an embodiment of the invention would be if the rules governing the new telephone call instruct that the telephone call should ring through (that is, be connected to the user at the called number) or that the telephone call should be forwarded to another number. And in either of these situations, call waiting would occur only if the telephone where the call was directed is in use at the time the call is processed.

Figure 9:
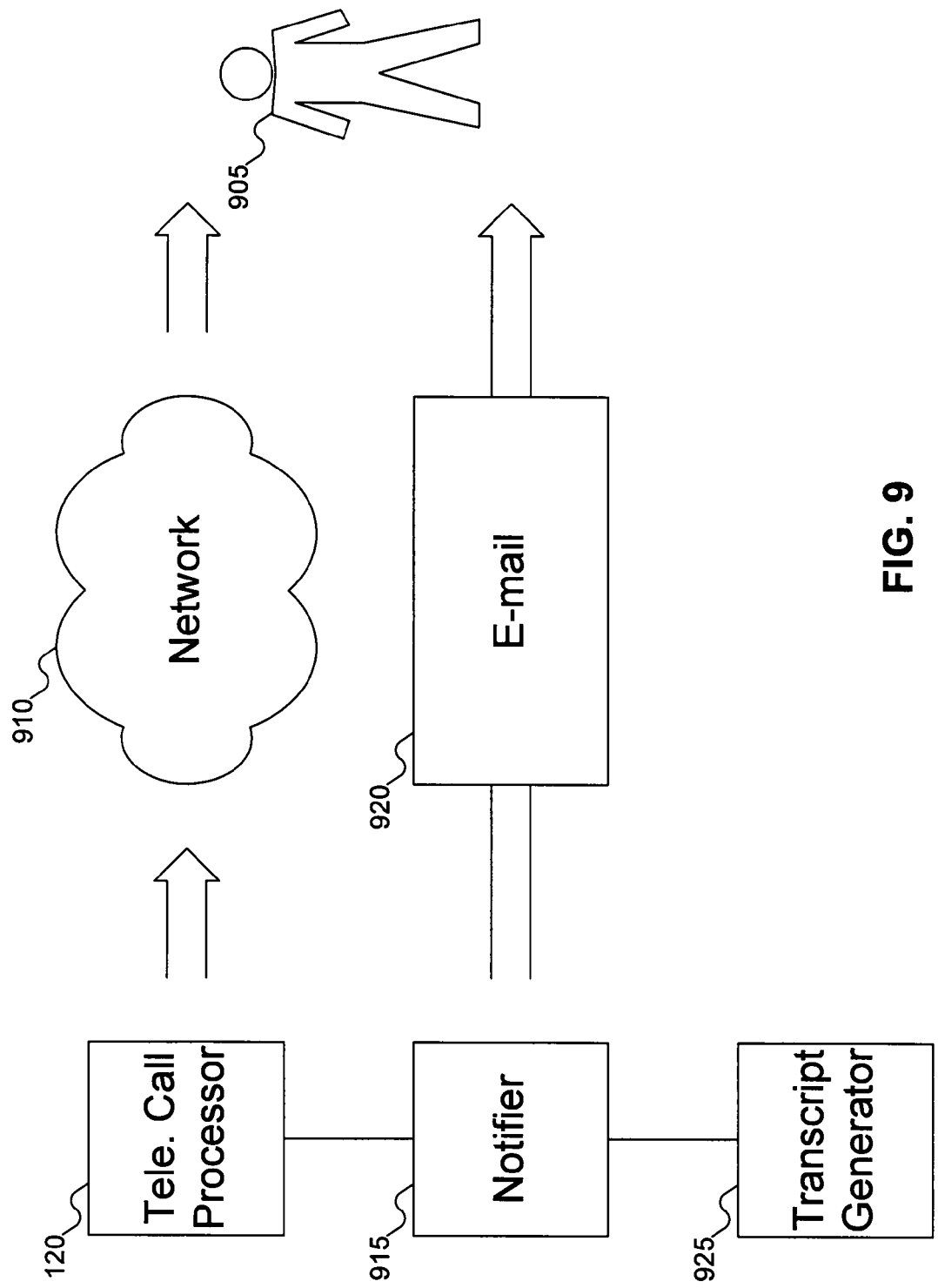
FIG. 9 shows the telephone call processor of FIGS. 1 and 8 e-mailing a user about a telephone call.

In one embodiment of the invention, once the call is processed, the telephone call processor 120 has completed its operation. But in another embodiment of the invention, the telephone call processor 120 can notify the user that something has happened. FIG. 9 demonstrates this situation.

In FIG. 9, telephone call processor 120 of FIGS. 1 and 8 is shown e-mailing user 905 about a telephone call. For example, telephone call processor 120 is shown as being connected to network 910. Using the connection to network 910 and notifier 915, telephone call processor 120 can send e-mail 920 to user 905. E-mail 920 can include a notice that telephone call processor 120 has processed a telephone call, and can include information about the telephone call (for example, the identity of the calling party, or the time the call was received). In one embodiment, telephone call processor 120 only sends e-mail 920 to user 905 if the telephone call is blocked or sent to voicemail, on the premise that if the call is allowed to ring through or forwarded to another telephone number, the user will receive the telephone call immediately. But in another embodiment of the invention, telephone call processor 120 can notify user 905 about any processing of the telephone call, whether of a specific type of processing or for all types of processing.

In one embodiment of the invention, the user can specify a single e-mail address to which an e-mail notification is to be sent. But, just like telephone call processing, a person of ordinary skill in the art will recognize that the user can specify different e-mail addresses to which notification should be sent: the e-mail address used could then depend on the identity of the calling party (just like how the telephone call is processed).

If the rule applied to the telephone call included routing the telephone call to a voicemail, notifier 915 can include transcript generator 925. Transcript generator 925 can generate a transcript of a voicemail message (assuming that telephone call processor 120 can retrieve the voicemail message from the voicemail box or intercept the voicemail message as it is being recorded). This transcript can be generated using voice recognition technology. By including a transcript, the user is not required to log in to the voicemail system to retrieve the message: the user can simply read the transcript of the voicemail message.

While FIG. 9 shows telephone call processor 120 notifying user 905 via e-mail 920, a person of ordinary skill in the art will recognize that any desired from of notice can be used: the notice can take a written form or any other desired form. For example, the notice could be a short message service (SMS) message to a cellular telephone number, or an automated telephone call, or a tactile alert (such as the vibration of a cellular telephone or a pager), among other possibilities.

Figure 10:
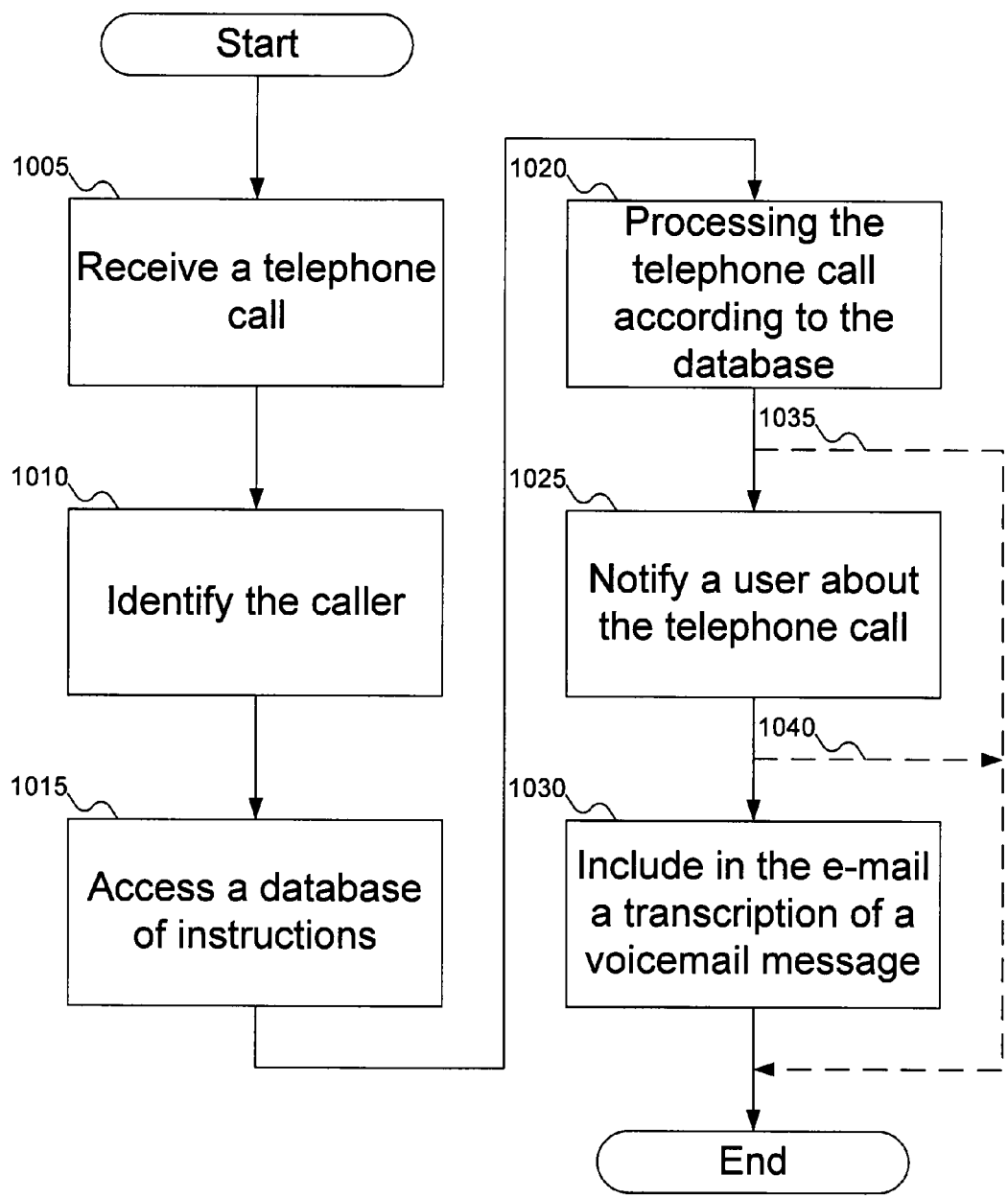
FIG. 10 shows a flowchart of a procedure for processing a telephone call according to embodiments of the invention.

FIG. 10 shows a flowchart of a procedure for processing a telephone call according to embodiments of the invention. In FIG. 10, at block 1005, the telephone call processor receives a telephone call. At block 1010, the telephone call processor identifies the telephone number of the calling party. At block 1015, the telephone call processor accesses a database of rules, to identify the rules applicable to the calling party. At block 1020, the telephone call is processed according to the applicable rules, based on the time the call was placed, which involves applying the instruction applicable to the calling party at the time the call was placed.

At block 1025, the telephone call processor can notify the user about the telephone call. As discussed above with reference to FIG. 9, this notification can include an e-mail sent to the user at some e-mail address. If the notification includes an e-mail, and the telephone call was processed by routing the telephone call to a voicemail message, then at block 1030 the telephone call can include a transcript of the voicemail message. Blocks 1025 and 1030 are optional, as shown by dashed arrows 1035 and 1040.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE)802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other non-transitory storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
   a receiver to receive a first telephone call from a first telephone number at a time during a first time interval;
   an identifier to identify a first caller of said first telephone call;
   a database of processing instructions, the database configured to store, for at least said first caller of said first telephone call, a first instruction for said first time interval and a second instruction for a second time interval, wherein said first time interval and said second time interval do not overlap, and said first instruction and said second instruction are different; and
   a processor to process said first telephone call according to the database, wherein said first instruction includes an override option to control whether said first caller of said first telephone call is permitted to override processing of said first telephone call during the first time interval according to processing instructions of the database and the receiver is not in use in a telephone call at said time.

2. A system according to claim 1, wherein said first instruction and said second instruction are each drawn from a set including: blocking said first telephone call, routing said first telephone call to a voicemail box, forwarding said first telephone call to a second telephone number, and ringing a telephone assigned to a called number of said first telephone call.

3. A system according to claim 1, wherein the database is further capable of storing at least a first default instruction that can be used to process telephone calls from a second caller of a second telephone call for which the database has no instruction.

4. A system according to claim 3, wherein the database is further capable of storing said first default instruction for a third time interval and a second default instruction for a fourth time interval, wherein said third time interval and said fourth time interval do not intersect, and said first default instruction and said second default instruction are different.

5. A system according to claim 1, wherein the identifier is operative to identify said first caller of said first telephone call by identifying a first calling telephone number from a caller ID of said first telephone call.

6. A system according to claim 1, wherein the identifier is operative to identify said first caller of said first telephone call using an identifier other than a first calling telephone number.

7. A system according to claim 1, wherein the system is installed at a telephone service provider.

8. A system according to claim 1, wherein the system is installed at a site including a telephone.

9. A system according to claim 1, further comprising an interface to modify the database.

10. A method, comprising:
    receiving a first telephone call at a time during a first time interval when a called party of the first telephone call is not in a telephone call;
    identifying a first caller of the first telephone call;
    accessing a database of processing instructions, the database of processing instructions configured to store, for at least the first caller, a first instruction for the first time interval and a second instruction for a second time interval, wherein the first time interval and the second time interval do not overlap, the first instruction and the second instruction are different;
    if the first instruction indicates that the first caller of the first telephone call can override the first instruction, offering to the first caller the option of overriding the first instruction and ringing a telephone at a called number of the first telephone call; and
    processing the first telephone call according to the database of processing instructions or the overriding of the first instruction.

11. A method according to claim 10, wherein accessing a database of processing instructions includes accessing the database of processing instructions, the first instruction and the second instruction each drawn from a set including: blocking the first telephone call, routing the first telephone call to a voicemail box, forwarding the first telephone call to a second telephone number, and ringing a telephone at a called number of the first telephone call.

12. A method according to claim 10, wherein accessing a database of processing instructions includes accessing the database of processing instructions, the database of processing instructions further including a first default instruction applicable to telephone calls from a second caller of a second telephone call for which the database does not include an instruction.

13. A method according to claim 10, wherein identifying a first caller of the first telephone call includes identifying a first calling telephone number from a caller ID of the first telephone call.

14. A method according to claim 10, wherein identifying a first caller of the first telephone call includes identifying an identifier other than a first calling telephone number.

15. A method according to claim 10, wherein receiving a first telephone call includes receiving the first telephone call at one of a plurality of called telephone numbers.

16. A method according to claim 10, wherein if the first instruction includes routing the first telephone call to the voicemail box, processing the telephone call according to the database of processing instructions includes routing the first telephone call to one of a plurality of voicemail boxes based on the first caller.

17. A method according to claim 10, wherein if the first instruction includes forwarding the first telephone call to a second telephone number, processing the telephone call according to the database of processing instructions includes forwarding the first telephone call to one of a plurality of second telephone numbers based on the first caller.

18. An article, comprising a non-transitory storage medium, said non-transitory storage medium having stored thereon instructions that, when executed by a machine, result in:
    receiving a first telephone call at a time during a first time interval when a called party of the first telephone call is not in a telephone call;
    identifying a first caller of the first telephone call;
    accessing a database of processing instructions, the database of processing instructions configured to store, for at least the first caller, a first instruction for the first time interval and a second instruction for a second time interval, wherein the first time interval and the second time interval do not overlap, and the first instruction and the second instruction are different;
    if the first instruction indicates that the first caller of the first telephone call can override the first instruction, offering to the first caller the option of overriding the first instruction and ringing a telephone at a called number of the first telephone call; and
    processing the first telephone call according to the database of processing instructions or the overriding of the first instruction.

19. An article according to claim 18, wherein accessing a database of processing instructions includes accessing the database of processing instructions, the first instruction and the second instruction each drawn from a set including:

blocking the first telephone call, routing the first telephone call to a voicemail box, forwarding the first telephone call to a second telephone number, and ringing a telephone at a called number of the first telephone call.

20. An article according to claim 18, wherein:
identifying a first caller of the first telephone call includes:
  identifying a first calling telephone number of the first telephone call; and
  mapping the first calling telephone number of the first telephone call to an identifier other than the first calling telephone number; and
processing the telephone call according to the database of processing instructions includes processing the telephone call according to the database of processing instructions based on the identifier other than the first calling telephone number.

21. An article according to claim 18, wherein if the first instruction includes routing the first telephone call to the voicemail box, processing the telephone call according to the database of processing instructions includes routing the first telephone call to one of a plurality of voicemail boxes based on the first caller.

22. An article according to claim 18, wherein if the first instruction includes forwarding the first telephone call to a second telephone number, processing the telephone call according to the database of processing instructions includes forwarding the first telephone call to one of a plurality of second telephone numbers based on the first caller.

23. An article according to claim 18, wherein said machine includes a cellular telephone.

24. An article according to claim 18, wherein accessing a database of processing instructions includes accessing the database of processing instructions, the database of processing instructions further including a first default instruction applicable to telephone calls from a second caller of a second telephone call for which the database does not include an instruction.

25. An article according to claim 18, wherein receiving a first telephone call includes receiving the first telephone call at one of a plurality of called telephone numbers.

\* \* \* \* \*